US008500534B2

(12) United States Patent
Rasmussen et al.

(10) Patent No.: US 8,500,534 B2
(45) Date of Patent: Aug. 6, 2013

(54) GAMING MACHINE HAVING DISPLAY WITH SENSORY FEEDBACK

(75) Inventors: James M. Rasmussen, Chicago, IL (US); Alfred Thomas, Las Vegas, NV (US); Gene Rigsby, Chicago, IL (US); Gilbert J. Q. Burak, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1424 days.

(21) Appl. No.: 11/983,148

(22) Filed: Nov. 7, 2007

(65) Prior Publication Data

US 2008/0132313 A1 Jun. 5, 2008

Related U.S. Application Data

(63) Continuation-in-part of application No. PCT/US2006/034830, filed on Sep. 7, 2006.

(60) Provisional application No. 60/715,237, filed on Sep. 8, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/16; 463/25; 463/30; 463/36; 463/37; 463/38

(58) Field of Classification Search
USPC .............................. 463/16, 25, 30, 36, 37, 38
See application file for complete search history.

(56) References Cited

U.S. PATENT DOCUMENTS

| | | | |
|---|---|---|---|
| 5,889,670 | A | 3/1999 | Schuler et al. |
| 6,020,875 | A | 2/2000 | Moore et al. |
| 6,020,876 | A | 2/2000 | Rosenberg et al. |
| 6,024,576 | A | 2/2000 | Bevirt et al. |
| 6,104,158 | A | 8/2000 | Jacobus et al. |
| 6,110,041 | A | 8/2000 | Walker et al. |
| 6,139,324 | A | 10/2000 | Roy et al. |
| 6,252,579 | B1 | 6/2001 | Rosenberg et al. |
| 6,256,011 | B1 | 7/2001 | Culver |
| 6,281,651 | B1 | 8/2001 | Haanpaa et al. |
| 6,293,866 | B1 | 9/2001 | Walker et al. |

(Continued)

FOREIGN PATENT DOCUMENTS

| | | |
|---|---|---|
| WO | 99/56087 | 11/1999 |
| WO | 02/078810 A1 | 10/2002 |

(Continued)

OTHER PUBLICATIONS

International Search Report, PCT/US2006/034830, 3pages, dated Jul. 9, 2007.

*Primary Examiner* — Omkar Deodhar
*Assistant Examiner* — Adetokunbo O Torimiro
(74) *Attorney, Agent, or Firm* — Nixon Peabody LLP

(57) ABSTRACT

A method of conducting a wagering game on a gaming machine includes the steps of displaying a selectable game element on a display and associating each potential outcome associated with the selectable game element with a predetermined haptic output selected from a plurality of predetermined haptic device outputs. The method also includes the steps of selecting the selectable game element to reveal an outcome associated therewith and causing a haptic device to output the predetermined haptic output corresponding to the outcome of the selectable game element.

21 Claims, 7 Drawing Sheets

U.S. PATENT DOCUMENTS

| | | | | |
|---|---|---|---|---|
| 6,300,938 | B1 | 10/2001 | Culver | |
| 6,304,091 | B1 | 10/2001 | Shahoian et al. | |
| RE37,528 | E | 1/2002 | Hannaford et al. | |
| 6,424,333 | B1 | 7/2002 | Tremblay et al. | |
| 6,429,846 | B2 | 8/2002 | Rosenberg et al. | 345/156 |
| 6,545,661 | B1 | 4/2003 | Goschy et al. | |
| 6,564,168 | B1 | 5/2003 | Hasser | |
| 6,585,515 | B1 | 7/2003 | Roy et al. | |
| 6,623,357 | B2 | 9/2003 | Chowdhury | |
| 6,659,773 | B2 | 12/2003 | Roy et al. | |
| 6,662,560 | B2 | 12/2003 | Roy et al. | |
| 6,680,729 | B1 | 1/2004 | Shahoian et al. | |
| 6,683,437 | B2 | 1/2004 | Tierling | |
| 6,693,622 | B1 | 2/2004 | Shahoian et al. | |
| 6,703,550 | B2 | 3/2004 | Chu | |
| 6,704,683 | B1 | 3/2004 | Hasser | |
| 6,762,745 | B1 | 7/2004 | Braun et al. | |
| 6,781,569 | B1 | 8/2004 | Gregorio et al. | |
| 6,802,778 | B1 | 10/2004 | Lemay et al. | |
| 6,833,846 | B2 | 12/2004 | Hasser | |
| 6,864,877 | B2 | 3/2005 | Braun et al. | |
| 6,866,643 | B2 | 3/2005 | Kramer | |
| 6,903,721 | B2 | 6/2005 | Braun et al. | |
| 6,904,823 | B2 | 6/2005 | Levin et al. | |
| 6,906,697 | B2 | 6/2005 | Rosenberg | |
| 6,924,787 | B2 | 8/2005 | Kramer et al. | |
| 6,933,920 | B2 | 8/2005 | Lacroix et al. | |
| 6,937,033 | B2 | 8/2005 | Boronkay et al. | |
| 6,965,370 | B2 | 11/2005 | Gregorio et al. | |
| 6,979,164 | B2 | 12/2005 | Kramer | |
| 6,995,744 | B1 | 2/2006 | Moore et al. | |
| 7,024,625 | B2 | 4/2006 | Shalit | |
| 7,050,955 | B1 | 5/2006 | Carmel et al. | |
| 7,056,123 | B2 | 6/2006 | Gregorio et al. | |
| 7,061,466 | B1 | 6/2006 | Moore et al. | |
| 7,070,571 | B2 | 7/2006 | Kramer et al. | |
| 7,096,852 | B2 | 8/2006 | Gregorio | |
| 7,112,737 | B2 | 9/2006 | Ramstein | |
| 7,116,317 | B2 | 10/2006 | Gregorio et al. | |
| 7,148,875 | B2 | 12/2006 | Rosenberg et al. | 345/156 |
| 7,151,432 | B2 | 12/2006 | Tierling | |
| 7,154,470 | B2 | 12/2006 | Tierling | |
| 7,159,008 | B1 | 1/2007 | Wies et al. | |
| 7,161,580 | B2 | 1/2007 | Bailey et al. | |
| 7,182,691 | B1 | 2/2007 | Schena | |
| 7,196,688 | B2 | 3/2007 | Schena | |
| 7,198,137 | B2 | 4/2007 | Olien | |
| 7,205,981 | B2 | 4/2007 | Cunningham | |
| 7,233,476 | B2 | 6/2007 | Goldenberg et al. | |
| 7,245,202 | B2 | 7/2007 | Levin | |
| 7,280,095 | B2 | 10/2007 | Grant | |
| 7,283,120 | B2 | 10/2007 | Grant | |
| RE39,906 | E | 11/2007 | Roston et al. | |
| 7,319,374 | B2 | 1/2008 | Shahoian | |
| 7,321,799 | B2 | 1/2008 | Paillard | |
| 7,331,868 | B2 | 2/2008 | Beaulieu et al. | |
| 7,336,260 | B2 | 2/2008 | Martin et al. | |
| 7,336,266 | B2 | 2/2008 | Hayward et al. | |
| 7,367,886 | B2 | 5/2008 | Loose et al. | |
| 7,369,115 | B2 | 5/2008 | Cruz-Hernandez et al. | |
| 7,484,172 | B2 | 1/2009 | Walker et al. | |
| 7,722,453 | B2 | 5/2010 | Lark et al. | |
| 7,753,789 | B2 | 7/2010 | Walker et al. | |
| 7,766,747 | B2 | 8/2010 | Bonney et al. | |
| 7,803,053 | B2 | 9/2010 | Atkinson | |
| 7,883,413 | B2 | 2/2011 | Paulsen | |
| 7,918,738 | B2 | 4/2011 | Paulsen | |
| 2001/0005815 | A1 | 6/2001 | Rosenberg et al. | |
| 2001/0026266 | A1 | 10/2001 | Schena et al. | 345/163 |
| 2003/0018403 | A1* | 1/2003 | Braun et al. | 700/45 |
| 2003/0025723 | A1 | 2/2003 | Olien et al. | |
| 2003/0038776 | A1 | 2/2003 | Rosenberg et al. | 345/156 |
| 2003/0068053 | A1* | 4/2003 | Chu | 381/118 |
| 2003/0076298 | A1 | 4/2003 | Rosenberg | |
| 2004/0166930 | A1* | 8/2004 | Beaulieu et al. | 463/25 |
| 2004/0229192 | A1 | 11/2004 | Roy et al. | |
| 2005/0032568 | A1 | 2/2005 | Griswold et al. | 463/16 |
| 2005/0248549 | A1* | 11/2005 | Dietz et al. | 345/179 |
| 2005/0282603 | A1 | 12/2005 | Parrott et al. | |
| 2006/0022952 | A1* | 2/2006 | Ryynanen | 345/173 |
| 2006/0066569 | A1 | 3/2006 | Eid et al. | |
| 2006/0109256 | A1 | 5/2006 | Grant et al. | 345/173 |
| 2006/0119586 | A1 | 6/2006 | Grant et al. | 345/173 |
| 2006/0119589 | A1 | 6/2006 | Rosenberg et al. | 345/173 |
| 2006/0157632 | A1 | 7/2006 | Delson | 248/550 |
| 2006/0187215 | A1 | 8/2006 | Rosenberg et al. | 345/173 |
| 2006/0192771 | A1 | 8/2006 | Rosenberg et al. | 345/173 |
| 2006/0256075 | A1 | 11/2006 | Anastas et al. | 345/156 |
| 2006/0256234 | A1 | 11/2006 | Roy et al. | |
| 2006/0256972 | A1 | 11/2006 | Roy et al. | |
| 2006/0290662 | A1 | 12/2006 | Houston et al. | 345/156 |
| 2007/0013677 | A1 | 1/2007 | Rosenberg et al. | 345/173 |
| 2007/0040815 | A1 | 2/2007 | Rosenberg et al. | 345/173 |
| 2007/0057913 | A1 | 3/2007 | Eid et al. | |
| 2007/0122793 | A1 | 5/2007 | Orban et al. | |
| 2007/0182711 | A1 | 8/2007 | Grant et al. | |
| 2007/0232348 | A1 | 10/2007 | Tierling et al. | |
| 2007/0236449 | A1 | 10/2007 | Lacroix et al. | |
| 2007/0236474 | A1 | 10/2007 | Ramstein | |
| 2007/0242040 | A1 | 10/2007 | Ullrich et al. | |
| 2007/0279401 | A1 | 12/2007 | Ramstein et al. | |
| 2008/0024440 | A1 | 1/2008 | Olien et al. | |
| 2008/0055244 | A1 | 3/2008 | Cruz-Hernandez et al. | |
| 2008/0064499 | A1* | 3/2008 | Grant et al. | 463/36 |
| 2008/0068334 | A1 | 3/2008 | Olien et al. | |
| 2008/0084384 | A1 | 4/2008 | Gregorio et al. | |
| 2008/0100584 | A1 | 5/2008 | Hague et al. | |
| 2008/0109265 | A1 | 5/2008 | Roy et al. | |

FOREIGN PATENT DOCUMENTS

| | | | |
|---|---|---|---|
| WO | 03/012557 | A2 | 2/2003 |
| WO | 03/032289 | A1 | 4/2003 |
| WO | 03/051062 | A2 | 6/2003 |
| WO | 2004/036405 | A2 | 4/2004 |
| WO | 2004/038573 | A2 | 5/2004 |
| WO | 2004/109488 | A2 | 12/2004 |
| WO | 2004/111818 | A1 | 12/2004 |
| WO | 2004/111819 | A1 | 12/2004 |
| WO | 2005/057546 | A1 | 6/2005 |
| WO | 2005/065113 | A2 | 7/2005 |
| WO | 2005/065147 | A2 | 7/2005 |
| WO | 2006/017254 | A1 | 2/2006 |
| WO | 2006/019389 | A2 | 2/2006 |
| WO | 2006/036458 | A1 | 4/2006 |
| WO | 2006/071449 | A1 | 7/2006 |
| WO | 2007/047960 | A2 | 4/2007 |
| WO | 2007/059172 | A2 | 5/2007 |
| WO | WO 2007/143849 | | 12/2007 |
| WO | 2008/042745 | A2 | 4/2008 |
| WO | 2008/048831 | A2 | 4/2008 |
| WO | WO 2008/049217 | | 5/2008 |

* cited by examiner

GAMING MACHINE HAVING DISPLAY WITH SENSORY FEEDBACK

CROSS REFERENCE TO RELATED APPLICATIONS

This application is a continuation in part of PCT Application Serial No. US2006/034830, filed Sep. 7, 2006, and titled "Gaming Machine Having Display with Sensory Feedback," which claims priority from U.S. Provisional Application No. 60/715,237, filed on Sep. 8, 2005, each of which is hereby incorporated by reference in its entirety and from which priority is claimed.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present concepts relate generally to gaming machines and methods for playing wagering games, and more particularly, to gaming systems and methods having a display adapted, at least in part, to provide sensory feedback to a user interacting with the display.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

However, gaming machine displays have conventionally been used as a purely visual display and, most recently, as data input devices with the advent of touch screen technology. Therefore, opportunity exists to improve upon this display interface to further enhance the interaction between the gaming machine and the user and, consequently, to improve the gaming machine's entertainment value.

SUMMARY OF THE INVENTION

In one aspect of the present concepts, a method of conducting a wagering game on a gaming machine includes the steps of displaying a selectable game element on a display and associating each potential outcome associated with the selectable game element with a predetermined haptic output selected from a plurality of predetermined haptic device outputs. The method also includes the steps of selecting the selectable game element to reveal an outcome associated therewith and causing a haptic device to output the predetermined haptic output corresponding to the outcome of the selectable game element.

In yet another aspect of the present concepts, a gaming machine for conducting a wagering game comprises a display and a haptic device connected to a gaming machine input device, the input device being configured to receive a user input. The gaming machine also includes a controller coupled to the display and the haptic device configured, upon execution of associated instructions, to display randomly selected outcomes on the display, display at least one user-selectable game element on the display, and activate the haptic device in response to a user selection of the at least one user-selectable game element.

In another aspect of the present concepts, a wagering game for a gaming machine is provided, the wagering game comprising an instruction set configured, upon processing by a processor, to perform various acts. The acts include defining a plurality of potential random outcomes of the wagering game and associating each potential random outcome with one of a plurality of output signals to a haptic device. The acts also include outputting an output signal to the haptic device corresponding to an outcome of a selected game element and activating the haptic device in response to the output signal.

In another aspect of the wagering game for a gaming machine noted above, the wagering game can comprise an instruction set configured, upon processing by a processor, to further perform acts comprising defining a plurality of potential random outcomes of the wagering game, associating each potential random outcome with one of a plurality of output signals to a haptic device, outputting an output signal to the haptic device corresponding to an outcome of a selected game element, and activating the haptic device in response to the output signal.

In still another aspect of the wagering game for a gaming machine noted above, the wagering game can comprise an instruction set configured, upon processing by a processor, to further perform acts comprising displaying on a display a user-selectable element and a user-selectable game element and outputting the output signal to the haptic device to activate the haptic device in response to a user's concurrent selection of the user-selectable element and user-selectable game element.

In yet another aspect of the wagering game for a gaming machine noted above, the wagering game can comprise an instruction set configured, upon processing by a processor, to further perform acts comprising displaying on a display a first user-selectable game element and a second user-selectable game element and outputting the output signal to the haptic device to activate the haptic device in response to a user's concurrent selection of the first and the second user-selectable game elements.

In a further another aspect of the wagering game for a gaming machine noted above, the wagering game can comprise an instruction set configured, upon processing by a processor, to further perform an act comprising associating a motion of a displayed object adapted to move along a plurality of axes with a plurality of output signals to a haptic device, wherein a motion of the displayed object along a first axis is associated with an output signal to a haptic device to increase an intensity of a haptic device output, and wherein a motion of the displayed object along a second axis is associated with an output signal to a haptic device to decrease an intensity of a haptic device output.

In a further another aspect of the wagering game for a gaming machine noted above, the wagering game can comprise an instruction set configured, upon processing by a processor, to further perform an act comprising associating a motion of a displayed object adapted to move along a plurality of axes with an output signal to one of a plurality of haptic devices, wherein a motion of the displayed object along a first axis is associated with an output signal to a first haptic device, and wherein a motion of the displayed object along a second axis is associated with an output signal to a second device.

In still yet another aspect of the wagering game for a gaming machine noted above, the wagering game can comprise an instruction set configured, upon processing by a processor, to further perform acts comprising selecting a game element and holding the game element and moving the game element from a first position on the display to a second position on the display while holding the game element.

In any of the preceding aspects of the wagering game for a gaming machine noted above, the haptic device may comprise one or more of a haptic display, pen, button, joystick, mouse, display, finger, helmet, vest, belt, suit, boot, and/or glove.

In still another aspect of the present concepts, a method of operating a gaming machine having a haptic device is provided and comprises the acts of associating a game feature with an output signal to the haptic device, outputting the output signal to the haptic device substantially concurrent with an initiation of the game feature, and activating the haptic device in response to the output signal.

In still another aspect of the present concepts, a haptic button assembly comprises a frame, which comprises a peripheral wall defining an opening, the peripheral wall further comprising a lateral recess. The haptic button assembly also includes an insulating element dimensioned to occupy the opening defined by the frame, the insulating element itself defining an opening, and a floating lens, which comprises a transmissive element dimensioned to occupy the opening defined by the insulating element, the floating lens comprising a conductive path from a surface of the transmissive element to a conductive element on a bottom surface of the floating lens. The haptic button assembly also includes a motive element disposed within the lateral recess of the frame and in contact with the transmissive element, the motive element being configured to selectively apply kinetic energy to the transmissive element and a substrate comprising capacitive sensing elements in contact with the conductive element on a bottom surface of the floating lens.

In still another aspect of the present concepts, a haptic button assembly comprises a frame comprising a peripheral wall defining an opening, the peripheral wall further comprising a lateral recess, and an insulating element dimensioned to occupy the opening defined by the frame, the insulating element itself defining an opening. A floating lens is provided and comprises a transmissive element dimensioned to occupy the opening defined by the insulating element, the floating lens comprising a conductive path from a surface of the transmissive element to a conductive element on a bottom surface of the floating lens. A substrate is also provided which comprises capacitive sensing elements in contact with the conductive element on a bottom surface of the floating lens.

In another aspect of the present concepts, a haptic button assembly comprises a frame comprising a peripheral wall defining an opening, the peripheral wall further comprising a lateral recess, an insulating element dimensioned to occupy the opening defined by the frame, the insulating element itself defining an opening, a floating lens comprising a transmissive element dimensioned to occupy the opening defined by the insulating element, the floating lens comprising a conductive element or a conductive surface forming a conductive path from a surface of the transmissive element to a conductive element on a bottom surface of the floating lens, a motive element disposed within the lateral recess of the frame and in contact with the transmissive element, the motive element being configured to selectively apply kinetic energy to the transmissive element, and a substrate comprising capacitive sensing elements in contact with the conductive element on a bottom surface of the floating lens.

In a further aspect of the preceding haptic button assembly, the haptic button assembly may further comprises an OLED, LCD, active matrix display, passive matrix display, fluorescent display, or e-paper display disposed on the substrate under the floating lens display so as to be viewable through the floating lens transmissive element.

In another aspect of the present concepts, a button assembly comprises a frame comprising a peripheral wall defining an opening, the peripheral wall further comprising a lateral recess, an insulating element dimensioned to occupy the opening defined by the frame, the insulating element itself defining an opening, a floating lens comprising a transmissive element dimensioned to occupy the opening defined by the insulating element, the floating lens comprising a conductive element or a conductive surface forming a conductive path from a surface of the transmissive element to a conductive element on a bottom surface of the floating lens, and a substrate comprising capacitive sensing elements in contact with the conductive element on a bottom surface of the floating lens.

In a further aspect of the preceding button assembly, the button assembly according further comprises an OLED, LCD, active matrix display, passive matrix display, fluorescent display, or e-paper display disposed on the substrate under the floating lens transmissive element so as to be viewable through the floating lens transmissive element.

In another aspect of the present concepts, there is provided a method of operating a gaming machine having a haptic device, comprising associating a game feature with an output signal to the haptic device, outputting the output signal to the haptic device substantially concurrent with an initiation of the game feature, and activating the haptic device in response to the output signal.

Additional aspects of the present concepts will be apparent to those of ordinary skill in the art in view of the detailed description of various embodiments and exemplary illustrations, a brief description of which is provided below.

DETAILED DESCRIPTION

Figure 1A:
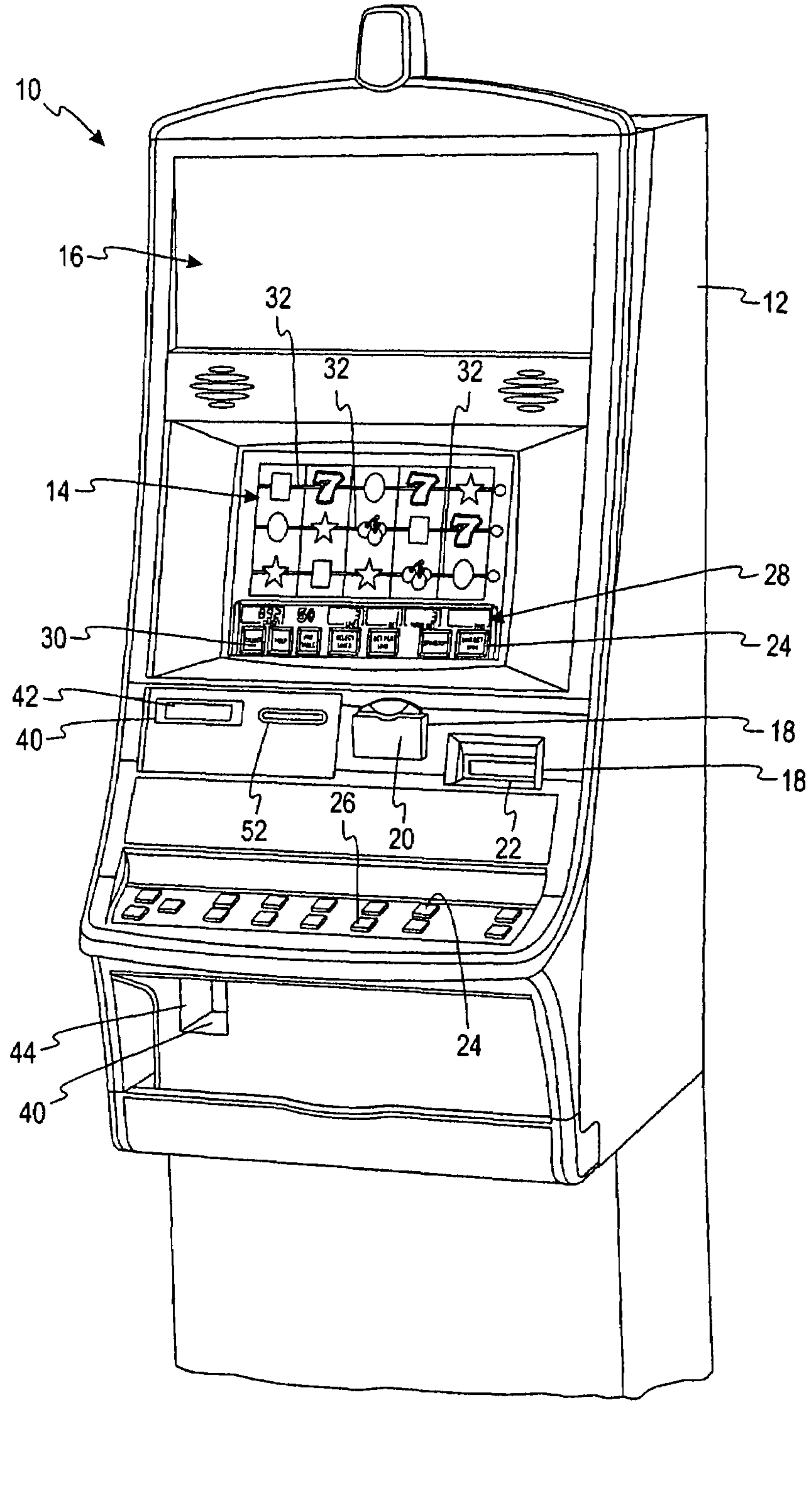
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, fastener, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
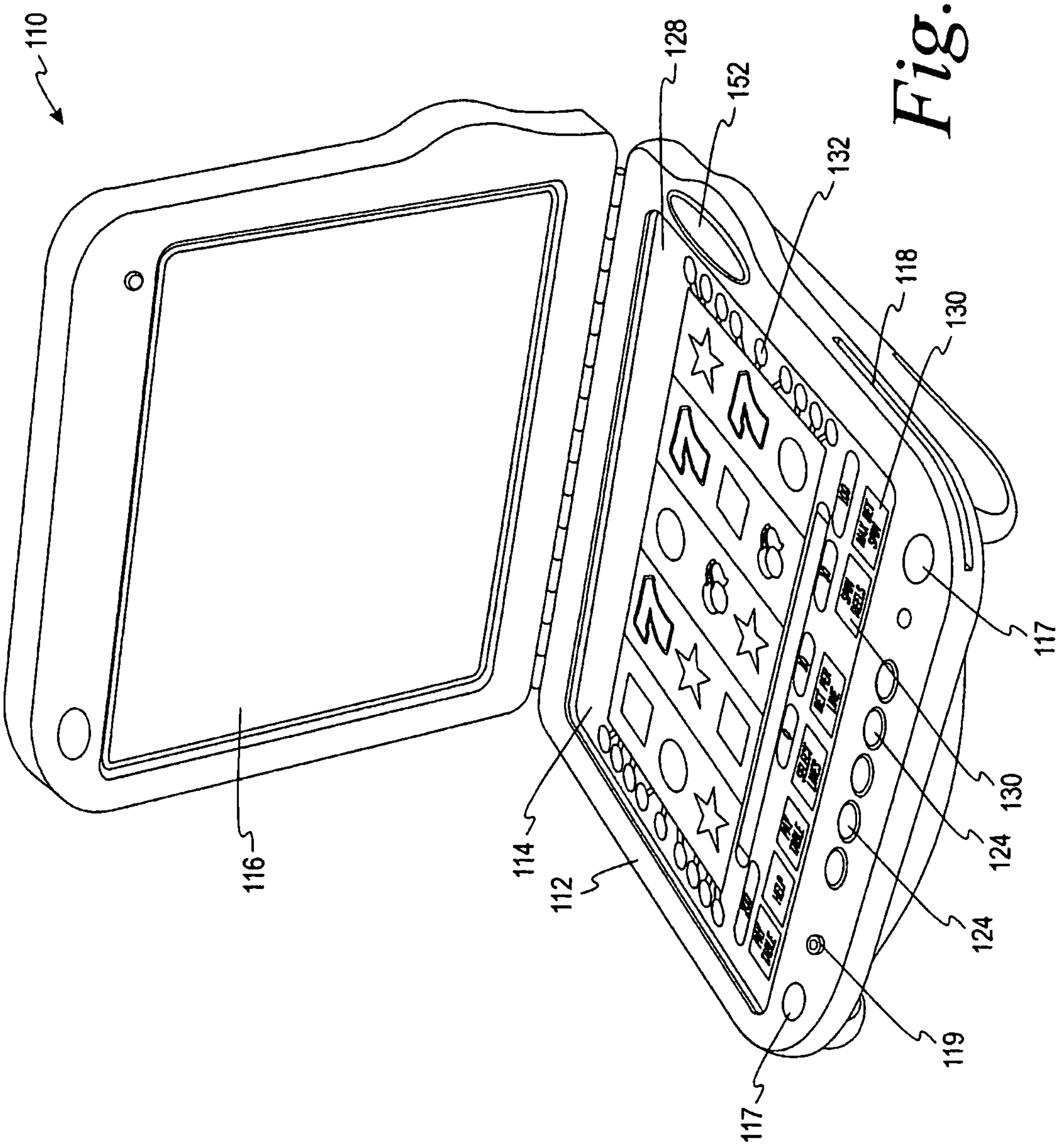
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible.

In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN, number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to or in place of the primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The player input device 124 may further or alternatively comprise, but is not limited to, a joystick, cursor control buttons, mouse, slide selection switch, a rotatable wheel, a rotatable wheel and button combination (e.g., like the RIM BlackBerry®), and/or, as described below, a movement sensor 200.

The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110.

The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
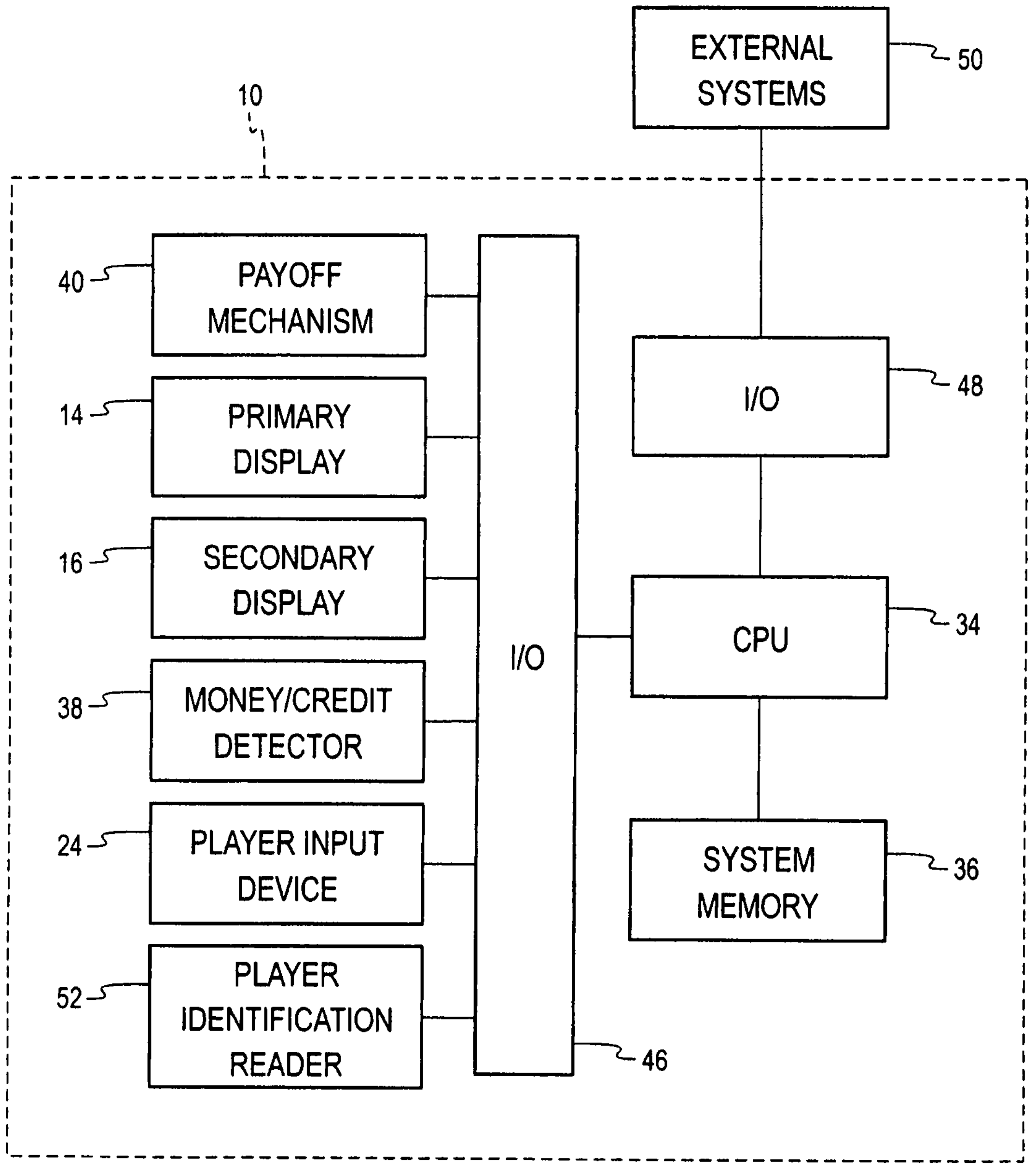
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other handheld gaming machines 110 or fixed (e.g., upright) gaming machines 10, a gaming server, a central game controller, wireless or hardwired communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, IPOD/MP3/digital music player, handheld entertainment device, mobile phone, etc.

While the gaming machine 10 of FIGS. 1 and 2 has been described with respect to a single wagering game providing a basic game and a bonus game, the gaming machine 10 may be connected, linked, or linkably or selectively coupled to other gaming machines for playing a community wagering game. Such coupled gaming machines may be connected to a common controller 34, which may be locally or remotely disposed and which may optionally reside within one of the gaming machines, or may be connected to separate controllers 34 having communication paths established therebetween. An optional signage may be provided including a game screen for displaying a game, a wagering game, game-related graphics, or other textual or graphical information related to the wagering game.

Figure 3A:
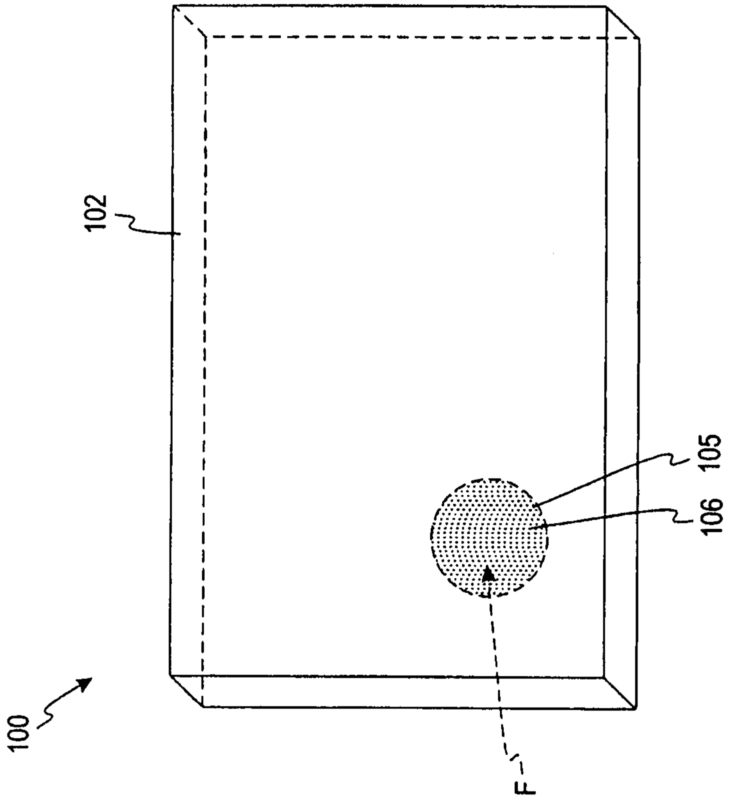
FIGS. 3(*a*) and 3(*b*)-(*c*) are, respectively, isometric and frontal illustrations of haptic displays in accord with some embodiments of the present concepts.
Figure 3C:
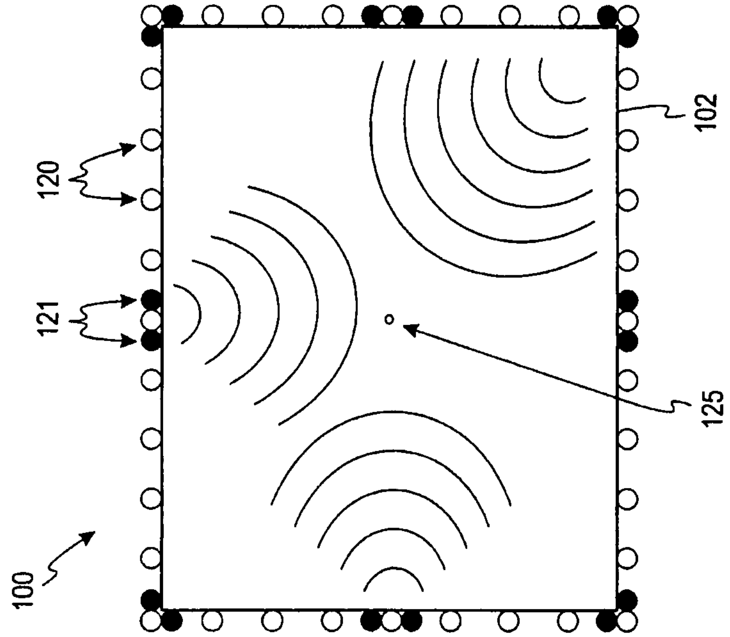
Figure 3B:
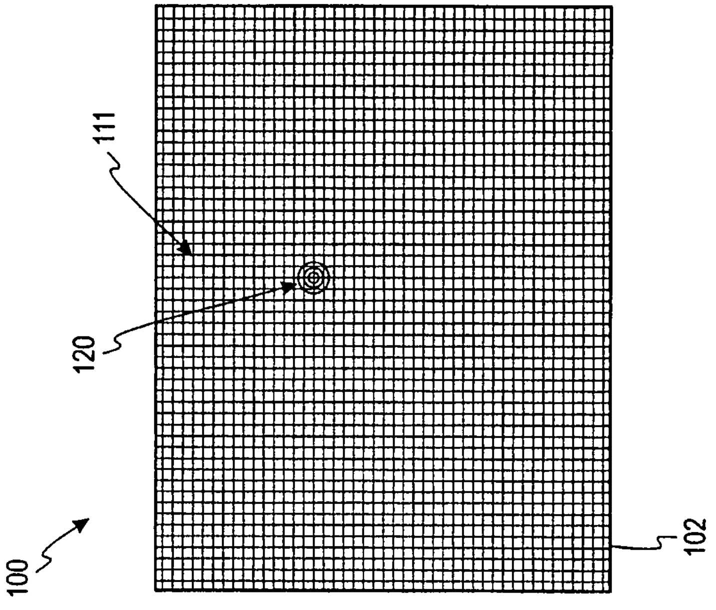

A haptic device 100 suitable for gaming machine 10 may include the haptic touch screen (Touchsense®) manufactured by Immersion Corporation of San Jose, Calif., such as represented in FIG. 3(*a*). The haptic device would also include an associated touch screen controller, software or host application, and haptic controller. When the user of the gaming terminal touches the hard surface of the touch screen display 102, as represented by the force arrow F in FIG. 3(*a*) directed toward a graphical button 105, the graphical button will appear to the user to depress and release. This effect, the perception of pressing physical switches, is created by piezoelectric elements (e.g., comprising transparent quartz) which vibrate in various modes. In the piezoelectric effect, an electric field set up in a suitable material by a voltage applied to two electrodes on its surface, causes a dimensional change of the material. The dimensional change may be used to create a vibration pulse(s), represented by the reference numeral 106 and associated graphic.

The haptic device 100 may comprise all types of touchscreen displays, including capacitive, resistive, surface acoustic wave (SAW) and infrared. The vibratory response of the piezoelectric elements may further be synchronized with the game machine speakers and/or display to enhance the overall perception that a physical button has been depressed and/or released through all of or part of an apparent range of motion of the button.

Other configurations and types of haptic devices 100 (e.g., haptic displays, interfaces and/or controllers) in accord with the present concepts may include, for example, a display substrate 102 having or being associated with an array 111 comprising piezoelectric elements 120, such as shown in FIG. 3(*b*). The piezoelectric elements 120 in turn may comprise various combinations of conductive elements, electrodes, transparent electrodes, switching elements, or the like, or any commercially available piezoelectric element, preferably a light-transmissive or transparent piezoelectric element. Damping elements may also be provided. In another example, a haptic device 100 may comprise a display substrate 102 having a plurality of piezoelectric elements 120 situated about a periphery of the substrate so as to provide peripheral vibration nodes, such as shown in FIG. 3(*c*). Suitable piezoelectric elements could comprise, but are not limited to, a transparent quartz, a transparent ceramic material such as lanthanum-doped lead zirconate-titanate (PZT or PLZT), or an artificial polycrystalline ferroelectric material.

These piezoelectric elements 120 may be used in various combinations, frequencies, and amplitudes to influence a resulting output at a specific point or region of the display, such as point 125 shown in the center of the display 100 in FIG. 3(*c*). In one aspect, the vibration at each specific point or region of the display results from a specific combination of outputs from one or more piezoelectric elements 120, and any applicable damping elements 121, and may be mapped and stored in a memory device. The piezoelectric elements 120 may therefore be used, singularly or in combination, to introduce pulse, wave fronts, and/or standing waves within a desired portion of the display substrate 102 or display-element attached thereto. Active damping elements 121 may also be provided about the periphery of the haptic display 100, such as shown in FIG. 3(*c*), to attenuate the influence of reflected waveforms/vibrations and to permit further control of the vibrations present at any selected portion of the display.

The haptic devices 100 in accord with the present concepts may also comprise piezoelectric transducers 120, or other types of transducers, having a slightly concave transmitting face to generate a concave wave front providing some degree of focusing or directionality in the applied vibration. Adjacent transducers used in the haptic interface, such as piezoelectric elements 120 in FIG. 3(*c*), may be selectively ganged or linked for pulsing at a common frequency so as to generate a wave front that is substantially planar and parallel to the axis of the transducers. If, however, the transducer excitation pulses are successively delayed between successive adjacent transducers, a wave front at an angle to the axis of the transducers may be generated. Similarly, the timing of the excitation of the various transducers may be selected so as to generate other types of waveforms (e.g., concave, convex).

Touch screens in accord with the present concepts may include display comprising a haptic interface or device 100, as noted above. The present concepts also include gaming machines 10 comprising conventional touch screen, wherein the display (e.g. 14) and controller (e.g., 34) are linked to one or more haptic devices 100 external to or removed from the display. For example, a chair, seat, or stool used in combination with the gaming machine may have incorporated therewith a haptic device 100 such as a subwoofer (e.g., "bass shakers") or actuator configured to generate subsonic and/or sonic vibrations. These haptic devices 100 could output vibrations synchronized with an on-screen display of fireworks, popping balloons, a roaring engine of a race car, a flight simulation, etc. For example, in a game displaying fireworks when an award is displayed, the thump of the fireworks output by the gaming machine speakers may be similarly replicated in the haptic device 100 so as to enable the user of the gaming machine to feel a physical thump or vibration corresponding to the wagering game's audio and visual output.

The bass shakers, or other manner of vibratory device or element, may also be used in lieu of or as a substitute for the output of sound through the speakers of a handheld device. Thus, information relating to game play or selections made by a player in a game play environment or a non-game play environment may be communicated to the player more discretely than would be possible using conventional speaker systems. Further, just as players are often enabled to control the volume of the sounds and music emanating from the gaming machine speakers, the haptic devices (e.g., vibratory devices) may be configurable by a player to output a desired amplitude or response selected from a menu or range of options. The haptic devices may even be configured to permit selection of various haptic "themes" by a player. For example, one player may desire haptic outputs comprising a selected "clicking" mode, whereas another player may desire haptic outputs comprising a selected "vibration" mode. Alternatively, instead of substituting the haptic outputs for the output of sound through the speakers of a handheld device, the haptic outputs (e.g., vibration) may be advantageously be used to enhance the sound effects in a gaming device, such as a hand held gaming device 110.

Figure 4A:
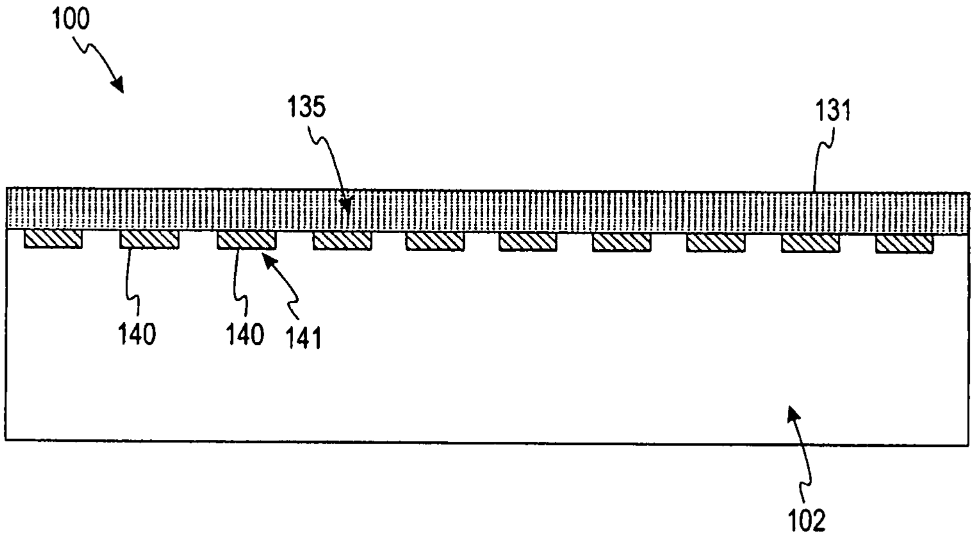
FIGS. 4(*a*)-(*b*) are cross-sectional views of haptic displays in accord with some embodiments of the present concepts.
Figure 4B:
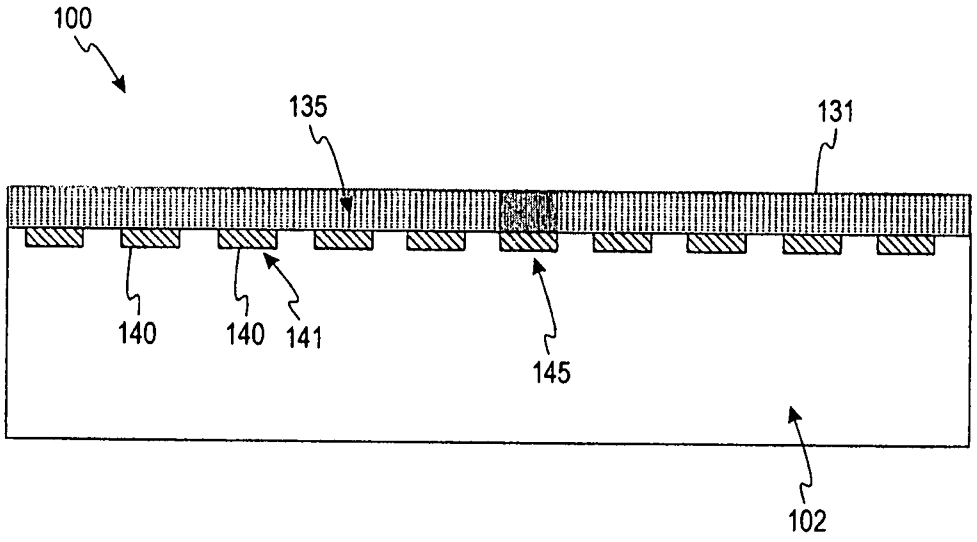

The present concepts are not limited to piezoelectric-element 120 haptic devices or audio-based devices and may embrace any mechanism by which rapid changes in the physical state of the display or other output device may be effected through changes in a variable such as, but not limited to, temperature, electric field, or magnetic field. The haptic device 100 could even include one or more devices configured to blow air and/or puffs of air on or toward a player of the gaming machine to create the sensation of wind or a pressure wave (e.g., an explosion, such as fireworks). The gaming machine 10 and/or haptic device 100 (e.g., haptic display) itself may include thermal, electrical and/or magnetic sources configured to bring about rapid localized environmental changes to utilize materials exhibiting such rapid state changes, some of which are noted below by way of example. Electrical and magnetic fields may be generated, for example, by conductors incorporated into the display, attached to the display, or provided within a sheet, film or coating applied to the display. A representation of conductive elements 140 disposed within channels 141 formed on a front side of a display substrate 102 is shown in FIGS. 4(*a*)-(*b*).

Electrodes and conductors 140 suitable for application to a display surface of a haptic display may comprise any optically transparent conductive materials such as, but not limited to, Indium Tin Oxide (ITO), which are conventionally used as transparent conductors and electrodes.

Rheological fluids can change state instantly through the application of an electric (i.e., electrorheological) or magnetic (i.e., magnetorheological) charge. In one example, a display in accord with the present concepts could utilize a thin layer of a transparent rheological fluid 135 (i.e., liquid or gas), such as shown in FIGS. 4(*a*)-(*b*), compartmentalized within a resilient housing 131. The housing 131 would be transparent and at least somewhat flexible at least on the side of the housing facing a user of the gaming machine. In response to an increased localized electric field and/or magnetic field from a source appropriate to the particular rheological fluid, such as conductor 140, the Theological fluid would change state (e.g., soft to firm or hard), such as represented in FIG. 4(*b*), to provide a different tactile sensation (i.e., harder) than in the equilibrium state. For example, the change in state can provide an intelligible communication. This may serve, in one aspect, to assist blind and visually impaired persons in the enjoyment of the gaming machine experience by providing a physical representation of a displayed outcome (e.g., a "7, 7, 7" on a reel-based display). The housing 131 may alternatively have another type of carrier, such as a suspension of non-colloidal, magnetically-polarizable particles in a non-magnetic medium such as silica gel, disposed therein.

Thermoresponsive materials, such as shape memory alloys (SMAs) may also be used to create a haptic interface or device 100. Micro polymer gels comprising cross-linked polymer networks inflated with a solvent (e.g., water) can also be used in accord with the present concepts. These gels reversibly swell or shrink in response to small changes in temperature or electric field. Micro-sized gel fibers can contract in milliseconds and can deliver sizable stress, approximately equal to human muscle fibers. Dielectric elastomers (electrostrictive polymers) exhibiting a mechanical strain when subjected to an electric field may also be used and provide a striction capability significantly higher than that of piezoceramic materials. In an electric field, the elastomer expands in the plane of the electrodes. Magnetostrictor materials, wet electroactive polymers, and conductive polymers may also be used.

In another example of the present concepts, the haptic device (e.g., haptic display) may include a heating sensation or effect. In one example, a thin transparent layer of a material, such as ITO, readily excitable by high-frequency vibration may be integrated with an outer surface of the display and/or provided in a transparent thin film or transparent housing attached to an outer surface of the display. Upon exposure to high-frequency vibration (e.g., piezoelectric elements 120), the material is excited to generate heat. The power level and duration of the heating could be controlled to provide no more than a slight, but nonetheless noticeable warming of a desired portion of the haptic device 100. Devices other than piezoelectric elements, such as those formed within array 111, may also be used to generate points of localized heat on the display including, but not limited to, transparent resistance heating elements (e.g., transparent electrodes) integrated into the display surface or photonic (e.g., light-based, IR, UV) heating elements. A thermoelectric heating and/or cooling device, such as those provided by Marlow Industries of Dallas, Tex., may be utilized.

In accord with at least some aspects of the present concepts, wagering games or game features may utilize haptic devices 100 as a part of game play or as an adjunct thereto to entertain a user. Although one user interface includes a tactile touch screen comprising a piezoelectric elements (e.g., array 111), other forms of haptic devices or interfaces 100 may also be integrated into the wagering game experience, either in combinations thereof or in isolation. For example, game features may, in accord with the present concepts, also or alternatively utilize one or more other types of haptic devices such as, but not limited to, a haptic pen, button, joystick, mouse, finger(s), helmet, suit, vest, belt, boot, seat, or glove, as may be conventionally available or as further developed henceforth.

The clicks, vibrations, and/or other sounds generated by the haptic device(s) 100 may, in some aspects, optionally substitute for or complement sound outputs. For example, a handheld gaming device may be configured so that the only sounds output by the device are those of the haptic device(s). One advantage of this configuration is that the minimization of sound output permits the player to focus more intently on the player's interaction with the gaming machine. In another example, the sounds generated by the haptic device(s) 100 are used to accentuate or enhance the sound effects in a hand held gaming device. For example, a string of firecrackers exploding on the display is accompanied by a brief, but intense, series of vibratory outputs from one of more a haptic device (s) 100.

As the haptic device relates to a button/pushbutton arrangement, it is desired to provide the player with a predictable tactile response corresponding to the button actuation so that the player may maintain visual contact with the primary display 14 and/or secondary display(s) 16. The tactile response can be accomplished in many ways, but in every case this response is identical every time the button is pressed. In some aspects, the haptic device or interface 100, in the form of a button, comprises a mechanical tactile response device such as a micro-switch having a "snap" action which is transmitted back through the button actuator to the player's finger. However, in preferred aspects of this embodiment, which may stand alone or which may be used in conjunction with other aspects and embodiments disclosed herein, a haptic button 100 is provided with the capability of controlling and varying the force and frequency of tactile response transmitted through the pushbutton to the player. In still other aspects, the capability of controlling and varying the force and frequency of tactile response transmitted through the pushbutton is advantageously coordinated with the game play.

In one embodiment, the tactile response is provided by disposing one or more controllable devices, such as micro-motors, piezo-electric devices, mini-solenoids, linear actuators, or pneumatic/hydraulic-systems to interact with the haptic button 100. The capability of controlling and varying the force and frequency of the tactile response is provided, in at least some aspects, by varying the frequency, amplitude, and/or duration of the output from such controllable device(s) to provide specific effects. By positioning such a controllable device adjacent to the actuator of a gaming device pushbutton, and by providing control signals to the controllable device based on receiving a button press, the resulting tactile response to the player can be as varied by a game designer to suit any desired game environment or experience.

A haptic button 100 comprising a controllable device in combination with a push button provides an added benefit in that the tactile response is not dependent upon an amount of movement of the button actuator. While conventional pushbuttons rely on a specific travel distance to give the feel of a button press, no actual travel is necessary with the haptic button 100. Moreover, the haptic button 100 may incorporate any switching method (e.g., electromechanical, electrical, electronic, conductive, optical, proximity, capacitive, etc.) and, optionally, a display output (e.g., lighting element, LED, OLED, display, etc.).

The pushbuttons on a gaming device have long been the standard method of providing a player's interface to the game's operation. Many players operate these buttons while maintaining visual contact with the main display (e.g., 114, 116 in FIG. 1*b*). In accord with the concepts presented herein, one goal of the disclosed game to player interface is to provide to the player a tactile response signifying a button actuation. As noted above, the tactile output or response can be accomplished in many ways and the present concepts do not limit the means by which the haptic effect is achieved. In many instances, the tactile output or response will be identical every time the button is pressed to enable the player to develop familiarity with the feel of the game. However, in other aspects of the present concepts, the tactile output of a button is advantageously configured to provide a situational response that is related to a particular state of the game. For example, in a "Leprechaun's Gold"® game made by WMS Gaming Inc. of Chicago, Ill., the haptic output of one or more of the buttons may be linked to the mode of the game, such that any haptic output increases in amplitude and/or frequency with increasing mode. Thus, a haptic button could provide a more intense response to the player in the "Super Super Hot Mode"™ than in the "Super Hot Mode"™. Thus, in accord with at least some aspects of the present concepts, a haptic button is configured to or configurable to provide more than one sensory output. The present concepts include, however, a haptic button configured to provide only one sensory output.

Prior methods of and devices for providing tactile response have typically relied upon a mechanical device (e.g., relying the "snap" action of a button actuator) to transmit a force through the button actuator to the player's finger. If the force is large enough, the player will feel the effect. However, such methods and devices are unable to control and vary the force and/or frequency of tactile response transmitted through the pushbutton to the player, and/or to coordinate these changes with respect to the state of game play, features which are provided by the disclosed haptic button 200, such as is disclosed by way of example in FIG. 5, described below.

Accordingly, in accord with the disclosed concepts, a haptic button (e.g., 200, FIG. 5) may advantageously include one or more motive or kinetic energy producing devices such as, but not limited to, motor(s), piezoelectric device(s), transducer(s), impulse generator(s), vibrator(s), solenoid(s), rheological fluid(s), thermoresponsive material(s), micro-polymer gel (s), dielectric elastomer(s), heating element(s), cooling element(s), etc., singly in any combination, wherein, in at least some aspects of at least some embodiments, this device or these devices can be operated over plural frequencies, such as a range of frequencies (e.g., a continuously variable range), and/or can be operated at one of a plurality of different durations, and/or permit a range of configurable or dynamically alterable responses, to thereby provide a button configurable to provide variable and/or specific effects. For example, one or more piezoelectric devices can be positioned adjacent to an actuator of a gaming device button, a touch screen or display of a gaming device button, or a floating lens 230, as described herein, to provide kinetic energy to the button "actuator," touch screen, display, floating lens, or the like, respectively, responsive to a game state, a button press, or a touch of the button by the player, or the like. Accordingly, the resulting tactile response to the player can be as varied as the imagination of the game designer.

Figure 5:
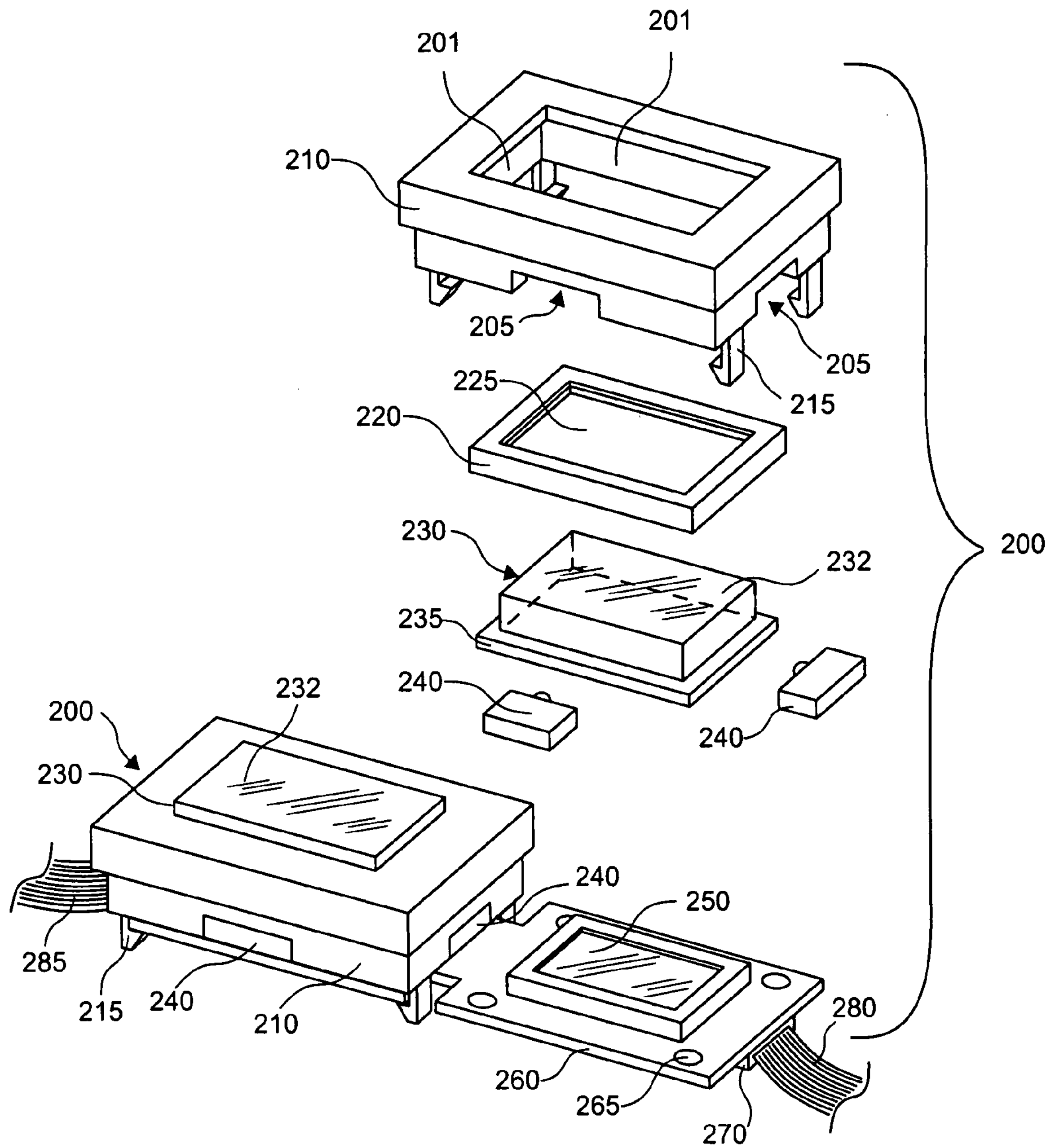
FIG. 5 shows a partial perspective exploded view of a haptic button panel in accord with at least some aspects of the present concepts.

There are numerous potential constructions for a haptic button in accord with the present concepts and the suitability for any particular design would be guided by the constraints faced by the designer. FIG. 5 shows one example of a haptic button panel in accord with aspects of the present concepts. Although FIG. 5 depicts one embodiment of a haptic button 200 panel, the present concepts are equally applicable to individual haptic button assemblies and to haptic button panels comprising more buttons than depicted or in arrangements other than that depicted. As shown in the example of FIG. 5, the haptic button panel includes two haptic buttons 200. The leftmost haptic button 200 is shown in an assembled state, while the rightmost haptic button is shown in an exploded view to illustrate the various components thereof including the bezel mounting frame 210, resilient insulator 220, floating lens 230, piezoelectric element(s) 240, and organic light emitting diode (OLED) display substrate 250, which may comprise but is not limited to, a printed circuit board (PCB) 260. Similar reference numerals are used to denote parts common to the haptic buttons 200.

The bezel mounting frame 210 may comprise, for example, a metal, alloy, plastic, ceramic, composite, or the like, and, in one aspect, comprises an injection molded plastic. The bezel mounting frame 210 may be transparent, semi-transparent, translucent or opaque. Although depicted in a rectangular configuration, the bezel mounting frame 210, as well as the other associated components in the haptic button 200, may assume any other desired shape including, but not limited to, a square, oval, circle, or polygon.

As shown in FIG. 5, the bezel mounting frame 210 defines, via interior periphery surfaces 201, an opening configured to receive a transmissive element 232 of the floating lens 230. The bezel mounting frame 210 comprises outwardly extending snap connectors 215, which are configured, in an assembled state, to engage an underside of the OLED display PCB 260. In alternative non-limiting aspects, the bezel mounting frame 210 may engage the OLED display substrate 260, or other mounting substrate, by a male/female connecting members, mechanical fasteners (e.g., screws), welding or thermal bonding, press-fit components, or adhesives (e.g., glue, epoxy, etc.). In such aspects, the connection points for the bezel mounting frame 210 would be configured to correspond to the type of connection (e.g., through holes for screws, lands for bonding, etc.) and may optionally omit the illustrated outwardly extending snap connectors 215. Assembly guides (not shown) may also be provided to facilitate alignment of the bezel mounting frame 210 relative to the OLED display PCB 260 and/or other haptic button 200 components or other substrate or panel during assembly of the haptic button. The bezel mounting frame 210 sidewalls define one or more recess(es) or opening(s) 205 into which the actuator(s) 240 are inserted and retained.

The resilient insulator 220 may comprise any resilient insulating material, such as, but not limited to, an elastomer or rubber. The function of the resilient insulator 220, however constructed or formed, is to prevent erroneous actuation of the button 200. Thus, the form factor for the resilient insulator may change in accord with a change to the actuation mechanism used in any particular button (e.g., resistive, capacitive, optical, etc.). In the embodiment shown in FIG. 5, the various portions of the resilient insulator 220 define an opening 225 through which the transmissive element 232 of the floating lens 230 may be disposed. The resilient insulator 220 functions to electrically insulate the transmissive element 232 of the floating lens 230 from the bezel mounting frame 210 and to permit the floating lens to move laterally (e.g., primarily along an X-axis and/or Y-axis). The resilient insulator 220 may also comprise openings or recesses to accommodate motive devices, such as the piezoelectric elements 240. The degree of lateral movement to be afforded the floating lens 230 need not be large and may, in certain aspects of the present concepts, comprise any degree of movement that is observable or tactilely noticeable by a player (e.g., a millimeter, less than a millimeter, microns, etc.) such as, but not limited to, a low frequency or high frequency vibratory movement or impulse(s). Although the embodiment of the haptic button 200 depicted in FIG. 5 does not incorporate an actuator that moves about the Z-axis or vertically with respect to the button, other embodiments could include actuators providing movement along the vertical or Z-axis, such Z-axis movement being disassociated from any switching function, providing only a haptic response. In such aspects, the switching function is achieved by non-Z-axis movement based parameters such as, but not limited to, completion of capacitive circuit by touch of player's finger to or placement of a player's finger in proximity to a surface of the floating lens 230 transmissive element 232, a switch activated by thermally induced change in a surface resistance of the transmissive element caused by the heat from a player's finger, interruption of surface acoustic waves formed along a surface of the transmissive element, or completion of a circuit employing resistive elements in a resistive touch panel. Further, although the example of FIG. 5 depicts a floating lens 230 configured to move laterally, the floating lens may be omitted in favor of a fixed transmissive element in accord with at least some aspects of the present concepts, such as in a non-haptic button assembly or a haptic button assembly in which the fixed boundary or boundaries are provided (e.g., for attenuation or dampening).

If desired, to provide an illusion that a movement of the transmissive element is related to a switching function when, in fact, it is not, a controller associated with the haptic button 200 may be configured to delay execution of the function associated with the switch actuation. In effect, this would cause the appearance that an allowed movement of the "push-button" along the Z-Axis for a pre-determined period of time, optionally in combination with a tactile response to the player at the lapse of such pre-determined period of time to provide for a feel of a button "stroke" and/or a visual indication of switch actuation at the lapse of such pre-determined period of time. In such embodiments, as noted above, the Z-axis movement of any component(s) of such a haptic button 200 does not contribute to a switching function for the haptic button.

The resilient insulator 220 ensures that the floating lens 230 is electrically isolated from unintended external conductive paths. In certain aspects, the touch of a player's finger on a conductive button surface completes a circuit, thereby initiating a haptic output from the button corresponding to one or more factors including, but not limited to, a state of game play. Thus, the floating lens 230 forms a touch receptor forming a conductive pathway supplying a single output function responsive to a player's touching of the transmissive element 232. The resilient insulator 220 may alternatively comprise a non-resilient insulating material, such as, but not limited to, a plastic or wood that is resiliently connected to the bezel mounting frame 210 (e.g., via a resilient element or spring). Additionally, the resilient insulator may comprise one or more parts and may be continuous or discontinuous so long as it is still able to capacitively and/or electrically insulate the floating lens 230 from the bezel mounting frame 210. The bezel mounting frame 210 may itself be formed from a non-conductive material, covered with a non-conductive coating, configured to substantially or entirely eliminate build up of a capacitive charge (e.g., separately grounded and insulated from the floating lens 230, use of a Faraday shield, etc.), so as to electrically or capacitively insulate the bezel mounting frame from the floating lens 230 appropriate to the particular configuration of the switching elements.

As noted above, in at least some aspects, the transmissive element 232 may comprise a capacitive touch receptor coated with a material (e.g., ITO, zinc-doped indium oxide (IZO), etc.) that conducts a continuous electrical current and forms a reference state capacitance field that is readily altered by another capacitance field (i.e., a player's finger). Circuits located near each corner of the floating lens 230 (e.g., capacitive sensors 265) measure the resultant "distortion" in the characteristics (e.g., wave characteristics) of the reference state capacitance field and this distortion is evaluated by a controller.

In the example shown in FIG. 5, conductors or conductive surfaces of the floating lens 230 maintain electrical contact, but not necessarily physical contact, with capacitive sensing pads 265 provided on OLED display substrate 260. For example, the transmissive element 232 of the floating lens 230 may be configured to permit establishment of a conductive path between a user's finger touching and the capacitive sensing pads 265 of the OLED display PCB 260 by using a transmissive element 232 formed of a transparent or semi-transparent conductive plastic, by disposing conductive fibers within the transmissive element to provide a conductive path from the top of the transmissive element to the bottom and/or sides of the transmissive element to connect with conductive elements on substrate 235, or by providing a conductive coating on at least the top surface of the transmissive element (e.g., a Ti—N or ITO transparent conductive coating) and sufficient portions of the side of the transmissive element to permit integration of other conductive elements in the conductive path. Where the floating lens 230 does not require transparency, non-transparent conductive coatings may be used. The floating lens substrate may itself also comprise vias containing a conductive material, conductive tracing, conductive coatings, or other conductive elements sufficient to provide an electrically conductive path between the transmissive element (or other button display interface) and the capacitive sensing pads 265. One capacitive circuit arrangement suitable for use in accord with the haptic button 200 includes the CapSense buttons and sliders manufactured by Cypress Semiconductor Corp. of San Jose, Calif. One or more capacitive sensing pads 265 may be provided, such as four, shown by way of example in FIG. 5.

It is further noted that the actuation of the haptic button (i.e., the switching function) may be accomplished not by actual contact of a player's finger with an exposed portion of the button (e.g., the transmissive element), but rather by a near field effect caused by the player's finger. For example, where a capacitively configured button exhibits fringe field effects, interruption of the fringe field by an approaching player's finger shunts a portion of the electric field to ground providing a resultant detectable decrease in capacitance, which may be used to effect the switching function. As noted above, any resulting effect of the switching may be advantageously delayed in time to enable the user to physically contact the button to provide an illusion that the contact with the button itself actuated the button or to synchronize a haptic effect with a corresponding visual effect associated with the actuation of the button. As another example, light beams could be used in close proximity to the The transmissive element 232 of the floating lens 230 may comprise, in various configurations, a transparent, semi-transparent, translucent or opaque material. The transmissive element 232 may further be configured to pass incident light without deflection (e.g., a window) or may be configured as a lens (e.g., a diverging lens). This material is attached to a substrate 235 or, alternatively, is formed with a separate ledge (i.e., 235) at a bottom portion thereof. A bottom portion of the substrate or ledge 235 is electrically connected to the capacitive elements 265 through conductive elements or coatings as noted above.

The lateral movement of the floating lens 230, caused by the piezoelectric elements 240, described in more detail below, is not a part of the switching function of the haptic button 200. Instead, the movement, such as a vibratory movement, merely conveys to the player information from the gaming machine (e.g., 10, 110). In accord with the configuration of a haptic button 200 shown in FIG. 5, the switching function is performed by the completion of the circuit between the button display (e.g., the transmissive element 232 of the floating lens 230) and the sensing elements incorporated therein to detect a player's input. For example, in a capacitive sensing arrangement, such as shown in FIG. 5, the selection by the player may be premised upon variables such as, but not limited to, a dwell time or the amount of time that a player has contact with the button. In various aspects, such variables may be preset by the manufacturer, set by the operator of the gaming machine, or may even be set by the player or adjusted by a player within permissible ranges through a player customization screen. Thus, unlike conventional push button actuators, which require movement of the actuator to effect a switching function, at least some embodiments of the disclosed haptic button 200 do not require any movement of the button, yet the button still provides the user with a sensory output (e.g., that a player's input has registered).

The substrate 260, upon which a display 250 may optionally be provided, is also electrically connected to other external circuits, components, or systems through an associated connector 270 and wire(s), ribbon(s) 280, 285, or other communication pathway (e.g., IR, RF transmitter or transceiver) so as to effect the desired switching, display and/or control functions.

The OLED display 250 is one example of a display that may be utilized in conjunction with the haptic button 200. Other display types may also be utilized. For example, the display function, where used, may be provided by an LCD, active matrix display, passive matrix display, vacuum fluorescent display, e-paper display, or the like. Alternatively, the display may comprise no video display, but may rather instead include a fixed legend such as, but not limited to, a backlit translucent button having alphanumeric characters printed thereon. However, to facilitate malleability of the gaming system and accommodate downloadable gaming environments wherein any number of a plurality of available wagering games are potentially downloadable to a gaming machine, it is advantageous for the haptic button 200 to include a variable or reconfigurable display. A variable or reconfigurable display permits, for example, reconfiguration of one or more haptic buttons 200 of a wagering game machine (e.g., 10, 110) initially configured to provide displays and haptic responses corresponding to a first wagering game to provide displays and haptic responses corresponding to the second wagering game in conjunction with a reconfiguration of the wagering game machine to play a second wagering game.

In accord with the present concepts, the piezoelectric elements 240 may be optionally omitted to provide a non-haptic button that is configured to provide a switching function through a capacitive coupling between the users finger and capacitive sensing elements associated with the button. The OLED display 250 may optionally be retained in such a non-haptic button to provide for button reconfigurability. In other words, as noted above, the button is reconfigurable to display any desired information at any time. For example, if a wagering game machine (e.g., 10, 110) is reconfigured to play a second wagering game, rather than a first wagering game, the buttons may be likewise reconfigured to correspond to the second wagering game rather than the first wagering game.

In accord with at least some embodiments of at least some aspects of the present concepts, a gaming device pushbutton is provided that does not predicate pushbutton switching on Z-axis movement (i.e., switching is not related to movement of a switch actuator along a Z-axis of or depthwise relative to a switch body), wherein the button is further provided with a variable or addressable display.

As noted above, in one example, a seat-based haptic device (e.g., a bass shaker) could be configured to output vibrations synchronized with a visual display of popping balloons, fireworks, or the like. The visual display may comprise any type of visual display including, for example, a gaming-machine display 14, signage 62, a 3-D display, a wearable display, and/or a virtual display. For example, in a game displaying fireworks when an award is displayed, the thump of the fireworks output by the gaming machine speakers may be similarly replicated in the haptic device so as to enable the user of the gaming machine to feel a physical thump or vibration corresponding to the wagering game's audio and visual output. This seat-based haptic device, or other haptic devices external to the gaming machine display, may be electrically connected to any player-input device and need not be linked to a display. One or more haptic devices 100 may be integrated into, for example, a gaming machine console, input device, seat, or, more generally, into the player's gaming space (i.e., a space around the player when the player is using the gaming machine) or even into a surrounding space (i.e., a space which might be occupied by observers of the game). These haptic devices 100 may be integrated with and/or synchronized with a visual display (e.g., signage 62) provided for a community-event game. Thus, a player may receive haptic input resulting from an action of another player within a community-event (e.g., one player pops a balloon and all players feel an output through a selected haptic device or devices).

One example of a game feature advantageously utilizing haptic technology includes a treasure hunting game in which players attempt to find hidden articles by means of a series of clues, players may be presented by a picking game, maze, or puzzle in which the player much make a choice or a series of choices, such as by selecting one or more icons or selectable elements. In one aspect, the player may further be invited or prompted to touch the display to gain additional input or clues from the gaming machine 10 prior to selection of an icon or other selectable element. In another aspect, the player may be invited to scan the screen searching for tactically-based awards or objects. For example, a player may be given a predetermined period of time, such as 5 seconds, to find a designated area of the screen containing a hot spot representing a game advancing outcome (e.g., finding a hidden door in a maze). Clues may be provided to the player, through any combination of a visual, auditory, and tactile output, to guide or assist the player. For example, a player attempting to find a hidden object by touching his or her finger to the display may be given feedback by the controller 34. As the player gets closer to his or her award, he or she may experience vibration of increasing frequency and/or amplitude and, correspondingly, as the player gets farther away from the award, he or she may experience vibration of decreasing frequency and/or amplitude. To make such aspects of the wagering game even more challenging, the game might even optionally include misdirectors or visual, auditory, and/or tactile clues intended to confuse and/or overwhelm the player's senses and thereby make the player's task more challenging, and potentially more rewarding (e.g., 2× increase for one level of misdirection, 4× for two levels of misdirection).

In one example, a player pick of a selectable element corresponding to a winning outcome or correct choice may result in the output of a low-frequency constant or pulsating vibration through an appropriate haptic device 100 (e.g., display, pen, joystick, mouse, seat, finger, glove, etc.), whereas a player pick of a non-winning outcome or an incorrect choice may result in the output of a high-frequency constant or pulsating vibration. Separate haptic outputs may be assigned to each selectable element or to groupings of selectable elements, such as for a first group of responses which benefit the player by advancing play or increasing an award and a second group of responses which would not yield such benefit. In another aspect, when a player is presented with a plurality of user-selectable elements, a haptic output may not be assigned to or associated with a second user-selectable element until a first user-selectable element has been selected or until another game play condition has been satisfied. Thus, in a card picking game where a player is challenged to match a first selected card (e.g., a King of Hearts) with another like card (i.e., another King), the selection of the first selected card causes the controller 34 to associate a "correct" haptic response, such as a low frequency pulsating vibration, with one of the three remaining Kings and to associate an "incorrect" haptic response, such as a high frequency constant vibration, with the remaining cards.

The gaming machine(s), system(s), and method(s) disclosed herein thus include the ability to link multiple buttons, icons, or portions of the display to work in combination with each other. The present concepts also include the ability to associate buttons, icons, or portions of the display to provide different outputs based on previous or concurrent player inputs and/or controller instructions in response to game states arising during game play. For example, where an array of selectable elements are presented on the display, one button touched in isolation might not provide any tactile sensation, or might provide a first tactile sensation, whereas two buttons touched in combination might provide a distinct second tactile sensation (e.g., signifying a beneficial outcome) or a distinct third tactile sensation (e.g., signifying a losing outcome).

A haptic device 100 may also include a haptic display functionally mated with wagering games involving sporting themes or shooting themes in accord with the present concepts. One sensory perception associated with games such as pinball, golf, or shooting (e.g., slingshot, bows) relates to resistance (i.e., a force which tends to oppose or retard motion). In a pinball/pachinko implementation of the present concepts, the player may continuously press an on-screen icon simulating a plunger on a traditional pinball/pachinko machine. This would build or increase the apparent resistance of the simulated plunger, such as by increasing the frequency and/or amplitude of the vibration in the area of the plunger, until the player releases the icon, sending the ball into play, or reaches the limit of the plunger travel. In another example, players can enter a simulated golf range wherein the player may be prompted to press an on-screen icon that simulates the backward swing of a golf club by building the apparent resistance of the golf club as it is drawn backward and upward until the player releases the icon, sending the golf ball onto the fairway, or reaches the upward extent of the golf club travel.

In yet another example, the gaming machine may present on the display a shooting gallery wherein the player is given, or is given the option to select from, a shooting device. Conceptually, the player would continuously press an on-screen icon which would provide a substantially continuously increasing resistance until the player releases the icon to shoot the shooting device. The shooting device could comprise, for example, a slingshot or bow which is a resistance based shooting device. In another aspect, however, the shooting device could comprise a gun and the gun trigger may be configured with to output an increasing resistance until a certain limit (e.g., a sweet spot) is reached, at which point the gun discharges and the resistance drops off abruptly. In another aspect, since it may be desired to "hold" the trigger at a set resistance (i.e., just below the sweet spot) until a target comes into range or comes within the sight of the gun, the on-screen icon associated with the gun trigger may be functionally linked to a second on-screen icon that a player could manipulate with another finger. For example, such a second on-screen icon could comprise a trigger lock that would stop the increasing output of the gun trigger on-screen icon at the desired limit until the trigger lock is removed, such as by removing the finger contacting the second on-screen icon. In each of these examples, the resistance is linked to the visual presentation of the object of interest (e.g., pinball plunger, golf club, bow string, slingshot band, gun trigger, etc.) so as to at least substantially synchronize the gaming machines visual and tactile sensory output. To further layer the sensory output available to enhance the player's gaming experience, gaming machines in accord with the present concepts may further synchronize auditory output with the visual and tactile outputs.

The on-screen icons could comprise, for example, a simulated button, slider, band, rotatable switch, or rotary dial. A plurality of such on-screen icons may be linked or ganged together competitively (i.e., to work in opposition) or cooperatively (i.e., to work together). An example of the competitive use of on-screen icons was presented above with regard to the gun trigger and the trigger lock. For cooperative linkage of on-screen icons, one example could include a player attempting to open a treasure chest with a heavy lid using a plurality of icons situated on the treasure chest to correspond to a placement of the players fingers. As the player attempts to open the treasure chest, the simulated resistance would be initially high and would decrease substantially uniformly across all of the on-screen icons as the treasure chest lid opens far enough to begin transferring some of the weight of the lid to the hinges connecting the lid to the treasure chest. It is to be noted that the actual use of icons as a visual aid is entirely optional. The functionality of the tactile touch screen in accord with the present concepts is in no way limited to the use of visual queues or clues. For example, the player may be prompted simply to put his or her fingers on the lid of the treasure chest and to move his or her fingers upwardly against the resistance to open the treasure chest. The gaming machine would be configured to provide a similar sensory feedback along the edges and regions of the displayed treasure chest lid.

Another aspect of wagering game play in accord with the present concepts includes a “click and drag” game feature. The clicking sensation is traditionally associated with a feeling of depressing a button and feeling a counteracting spring force from a spring positioned beneath the button surface. In accord with gaming machines embodying the present concepts, players may not only click on an icon, button, or object, but they may move the icon, button, or object about the screen, with an accompanying haptic response such as, for example, a pulsing vibration, a constant vibration, or bumps. The click and drag feature may, however, be provided independently of the haptic features disclosed herein.

In one aspect of the “click and drag” game feature, a player may be required to “capture” items and move them from one location in the game space to another location in the game space, preferably under a time constraint. If successful, the player may receive or qualify for an award, which may optionally be related to the amount of time that was required for the player to accomplish the task and/or that is related to the number of objects moved (e.g., higher awards for faster times and/or higher awards for greater numbers of objects moved). The gaming machine may be configured to provide a tactile output representing the capture of the selected item and this would continue as the player moves the selected item across the screen and would continue until the player releases the on-screen icon. Release of the on-screen icon “deposits” the item into its new location. An additional sensation can optionally be utilized to simulate the deposit or imminent release of the selected item. As noted above, an on-screen icon is optional. The displayed item itself, and on-screen location thereof, may be configured to provide the tactile sensory feedback. This feedback would thus dynamically reposition itself or “travel” as a player moves the selected item across the display. This feature further integrates the player into the realm of the game space by providing a more direct connection between the player and the manipulated object than is possible through traditional game play interfaces (i.e., icons, buttons, controls, etc.).

The present concepts are also extendable to permit representations of power level. Power levels also relate to increasing intensity (e.g., the amount or degree of strength of electricity, heat, light, etc.). As it relates to tactile touch screen technology and gaming, players may be permitted to enter, for example, a picking game whereby matches result in sensations such as described above, but the sensations increase in intensity depending upon the size of the award. For example, a match of three 5× multiplier symbols has a greater intensity than a match of three 2× symbols.

In another aspect of wagering game play which may take advantage of haptic devices 100, haptic gloves or tools may be used to manipulate objects within the game space. Haptic gloves are conventionally provided with vibrating piezo-electric elements and/or pneumatic channels, pockets, or bladders which may be filled with pressurized air so as to press against the user’s hand with varying degrees of force. In one aspect, the haptic glove may be instrumented or monitored to determine the position of and movement of predetermined points on the glove in space. The positions of these predetermined points would be translated to corresponding positions associated with an icon or image of a hand that would mirror the movement of the user’s hand in 3-D. A player of a wagering game may thus be challenged to move the haptic glove or tool to move the corresponding virtual hand or tool within a 2-D or 3-D game space.

Wagering games in accord with the present concepts may therefore include game features utilizing haptic devices 100, such as the virtual glove or tool (e.g., a pointed stick). For example, the user may be instructed to use the virtual glove or tool (i.e., by manipulation of the haptic glove or haptic tool) to pop rising or falling balloons. The popping of the balloons may be simulated, in one aspect, by gentle pressure waves being output by the haptic glove traveling from the point of the glove closest to the source (i.e., the popping balloon) to the point of the glove furthest from the source. In a game feature wherein a player is instructed to diffuse a bomb before a timer runs out, for example, an incorrect action or selection could activate both a piezo-electric element in a palm of the glove as well as all of the air pockets in the palm and fingers of the glove, concurrent with an output from a seat based haptic device 100 (e.g., bass shaker) and various speakers. In short, plural haptic devices may optionally be used in combination in accord with any particular game content to provide tactile input to the user and thereby enhance the user/machine interface.

In still another aspect of game play in accord with the present concepts, a plurality of lottery game ticket scratch-off surfaces may be presented on a display. The user may be instructed to “scratch off” the scratch-off surfaces using either a haptic display or another non-display based haptic device, such as a haptic glove, mouse, pen or tool. When the user “scratches” within the confines of the displayed scratch-off surfaces, the user will receive feedback (e.g., vibration) through the selected or provided haptic interface. In one aspect, the feedback could comprise a feeling of substantially continuous roughness/resistance from the portions of the scratch-off surface which remain with no such roughness/resistance from the portions of the scratch-off surface which have been removed.

In at least some embodiments, a small video reel may be provided beneath a moveable display screen or haptic display 100 wherein a user interfacing with the video reel (e.g., spinning or moving the reel) will result in a haptic output producing a sensation of clicking through different detents on the reel.

Thus, in at least some aspects of the present concepts, a wagering game for a gaming machine comprises instructions configured, upon processing by a processor, to perform various process steps leading to a haptic output to a user of the gaming machine. Where the haptic output is to be linked to an overall wagering game outcome, the instructions might cause the processor to associate each potential game element outcome with one particular output signal, out of a range of possible output signals, to a haptic device. Once the processor determines a wagering game outcome by comparing a set of game element outcomes to an award schedule, the processor would then output the output signal to the haptic device corresponding to a wagering game outcome to activate the haptic device in response thereto.

The haptic output may also be linked generally to a game feature, which may or may not be related to any specific wagering game outcome or game element outcome. For example, the game feature may announce entry into or qualification for a bonus round or special event based on a game outcome or game element outcome in the wagering game. In another example, the game feature may be initiated by a controller inviting a player of a gaming machine to join a group game based on a determination of the gaming machines' eligibility such as, but not limited to, satisfaction of a coin-in rate or quantity requirement. Where the haptic output is linked generally to a game feature, the processor associates a game feature with an output signal to a haptic device and outputs an output signal to the haptic device substantially concurrent with an initiation of the game feature. The haptic device is then activated in response to the output signal.

Each of these embodiments and obvious variations thereof is contemplated as falling within the spirit and scope of the claimed invention, which is set forth in the following claims. Moreover, the present concepts apply not only to basic wagering games, but also to bonus games and any other type of wagering game or associated game.

In yet another embodiment, a gaming machine display is provided with display-integrated speakers. This embodiment may be separate from, or may be combined with, the above-mentioned gaming machine embodiments utilizing the haptic display and/or other haptic outputs.

In one aspect of a gaming machine display-integrated speaker, a 19" liquid crystal display (LCD) for a gaming machine would be provided with a "speaker on glass" such as by, for example, deposition of transparent conducing polymer electrodes on top of a piezoelectric polymer thin film (PVDF or copolymer of vinylidenecyanide and vinyl acetate (PVCN-VAc)). A transparent loudspeaker may also include that currently provided by Sharp and Semiconductor Energy Laboratory of Japan in which the LCD display substrate is a continuous-grain silicon provided with piezoelectric acoustic drivers and audio circuitry integrated therewith. The gaming machine display may utilize piezoelectric audio transducers based on flat-speaker technology of New Transducers (NXT) of England, which employs distributed-mode actuators (DMA) having piezoelectric drive elements disposed on the LCD substrate to vibrate the glass surface and produce sound. The LCD display is also provided with a shift register latch, D/A converter, analog input preamplifier, volume control, and power amplifier.

In at least one aspect, the gaming machine display may incorporate not one integrated speaker, but a plurality of smaller speakers (e.g., 4, 8, 24, 36, 49, 64) to provide not only improved localization of a sound, but to permit the sound to move around the display. In combination with the tactile stimulus noted above, the sound emitted from the display-based speaker(s) could move synchronously with the tactile stimulus. The display-integrated speaker may further be selectively employed to only cover certain frequencies within the audible range, such as to eliminate conventional high frequency speaker elements (i.e., tweeters), while retaining conventional low frequency speaker elements (e.g., subwoofer). Elimination of any of the current gaming machine surface mounted speakers in this manner will free up marked volumetric space within the gaming machine, simplify manufacturing complexity and cost, and reduce maintenance costs.

Moreover, the display-integrated speaker need not be integrated into the gaming machine primary display, but may be provided in one or more secondary displays or in glass panels provided on the display bearing game-related artwork (painted glass) or advertisements (e.g., to offset licensing fees), or the like. Further, the display-integrated speaker need not be paired with a tactile display. In one aspect of the present concepts, a gaming machine could be provided with a dual display, one display (e.g., a top display) having tactile or sensory feedback, the other display (e.g., a bottom display) having one or more integrated speakers.

The appended claims reflect certain aspects and combinations of the present concepts, but are not exhaustive of all such aspects and combinations. For example, the haptic buttons disclosed herein may be advantageously deployed in technologies and applications other than wagering. The disclosed haptic buttons may be utilized, for example, on a remote "pushbutton" panel held by a user that it in wireless communication or remote communication with a computer or a device. Such haptic buttons may be used in any industry and in any application in which buttons are typically used or in which buttons would typically or potentially find use (e.g., vending machines, portable electronic devices, cell phones, PDAs, automobiles, stationary consoles, factory controls, pachinko machines, non-wagering games, etc.). Additionally, although some of the present concepts have been disclosed in relation to a button, similar concepts are applicable to elongated buttons, sliders, sliding graphic underlays, or the like. Still further, although aspects of the gaming machines 10, 110 describe the use of a touch screen, haptic effects need not be limited to inputs at specific locations on the display and may, for example, merely require a touch at any arbitrary point along a display surface to register the player's input, such as in the capacitive conductive pathways described in relation to FIG. 5. Further, the present concepts include all possible logical combinations of the claims and of the various claim elements appended hereto, without limitation, within the associated claim sets regardless of the presently indicated dependency.

What is claimed is:

1. A method of conducting a wagering game on a wagering game machine, comprising the steps of:

displaying, on a display device of the wagering game machine, a plurality of selectable haptic outputs available for assignment to a visual game element selected from a predetermined set of visual game elements from which a random selection is performed in association with a wagering game to randomly determine a wagering game outcome;

receiving an association of the visual game element with one player-selected haptic output selectable from a plurality of haptic device outputs;

storing the association of the visual game element with said one player-selected haptic output in a physical memory device operatively associated with the wagering game machine;

using a controller operatively associated with the wagering game machine, retrieving the association of the visual game element with one player-selected haptic output from the physical memory device in connection with the conducting of the wagering game on the wagering game machine; and using the controller operatively associated with the wagering game machine, causing a haptic device to output the selected haptic output responsive to a corresponding display of a randomly determined wagering game outcome comprising the visual game element.

2. The method according to claim 1, wherein the haptic device is haptic display.

3. The method according to claim 2, wherein the visual game element must comprises a part of or an entirety of a winning outcome, as defined in a paytable associated with the wagering game, as a precondition for causing the haptic device to output the selected haptic output responsive to a corresponding visual game element.

4. The method according to claim 3, wherein the visual game element associated with the one player-selected haptic output is selectable from a plurality of haptic device outputs consists of a single game symbol utilized in the wagering game.

5. The method according to claim 3, wherein the visual game element associated with the one player-selected haptic output selectable from a plurality of haptic device outputs comprises a plurality of game symbols utilized in the wagering game.

6. The method according to claim 3, further comprising the steps of:

receiving an association of a plurality of interlocked visual game elements with one player-selected haptic output selectable from a plurality of haptic device outputs;

storing the association of the plurality of interlocked visual game elements in a physical memory device operatively associated with the wagering game machine;

conditionally activating the haptic device to output the selected haptic output responsive to a display of the plurality of interlocked visual game elements on the wagering game machine display.

7. The method according to claim 2, further comprising the steps of:

displaying on a display of the wagering game machine a plurality of user-selectable game elements comprising at least a first user-selectable visual game element and a second user-selectable visual game element; and conditionally activating the haptic device, during subsequent wagering game play in a gaming session on the wagering game machine, in response to a user's concurrent selection of the first and second user-selectable visual game elements.

8. The method according to claim 1, wherein the haptic device is a haptic pushbutton and wherein the haptic pushbutton lacks a Z-axis actuator.

9. The method according to claim 8, wherein the haptic pushbutton comprises a floating lens.

10. A method according to claim 1, further comprising the steps of:

receiving an association of a second visual game element with a second player-selected haptic output selectable from a plurality of haptic device outputs;

storing the association of the second visual game element with the second player-selected haptic output in a physical memory device operatively associated with the wagering game machine;

using a controller operatively associated with the wagering game machine, retrieving the association of the second visual game element with second player-selected haptic output from the physical memory device in connection with the conducting of the wagering game on the wagering game machine; and using the controller operatively associated with the wagering game machine, causing a haptic device to output the second selected haptic output responsive to a corresponding display of a randomly determined wagering game outcome comprising the second visual game element.

11. A gaming machine for conducting a wagering game, comprising:

a display device;

a haptic device connected to a gaming machine input device configured to receive a player input; and a controller coupled to the display device and the haptic device configured, upon execution of associated instructions, to display on the display device a visual game element;

display on the display device, or on another display device, a plurality of selectable haptic outputs available for assignment to the visual game element;

receive an association of the selectable game element with one player-selected haptic output selectable from a plurality of haptic device outputs;

store the association in a physical memory device operatively associated with the wagering game machine;

use a controller operatively associated with the wagering game machine to retrieve the association of the visual game element with one player-selected haptic output from the physical memory device in connection with the conduct of the wagering game on the wagering game machine; and cause a haptic device to output the player-selected haptic output responsive to a corresponding display of a randomly determined wagering game outcome comprising the visual game element.

12. The gaming machine according to claim 11, wherein the haptic device comprises a display-integrated haptic device disposed adjacent a display surface of the display device.

13. The gaming machine according to claim 11, wherein the visual game element must comprises a part of or an entirety of a winning outcome, as defined in a paytable associated with the wagering game, as a precondition for causing the haptic device to output the selected haptic output responsive to a corresponding visual game element.

14. The gaming machine according to claim 11, wherein wherein the visual game element associated with the one player-selected haptic output is selectable from a plurality of haptic device outputs comprises a game symbol utilized in the wagering game.

15. The gaming machine according to claim 14, wherein the haptic device is a haptic pushbutton and wherein the haptic pushbutton lacks a Z-axis actuator.

16. A gaming machine according to claim 11, further comprising:

a plurality of haptic devices, at least one haptic device being connected to a gaming machine user input device; and a controller coupled to the at least one haptic device being connected to a gaming machine user input device, the controller being configured to activate the at least one haptic device in response to a user input using the user input device.

17. A gaming machine according to claim 11, wherein the controller is further configured, upon execution of associated instructions, to execute acts comprising:

receiving an association of a plurality of interlocked visual game elements with one player-selected haptic output selectable from a plurality of haptic device outputs;

storing the association of the plurality of interlocked visual game elements in a physical memory device operatively associated with the wagering game machine;

conditionally activating the haptic device to output the selected haptic output responsive to a display of the plurality of interlocked visual game elements on the wagering game machine display.

18. A gaming machine according to claim 11, wherein the haptic device comprises a haptic button.

19. A gaming machine according to claim 11, further comprising a plurality of haptic devices.

20. A wagering game system comprising a wagering game machine and a wagering game comprising an instruction set stored in a physical memory configured, upon processing by a processor of the wagering game system, to perform steps comprising:

associating a predetermined visual game element of the wagering game with one of a plurality of output signals to a haptic device of the wagering game machine;

randomly determining a wagering game outcome, using the processor;

displaying, on a display of the wagering game machine, a set of visual game elements corresponding to the randomly determined wagering game outcome;

outputting an output signal to the haptic device corresponding to an occurrence of said predetermined visual game element in the displayed wagering game outcome; and activating the haptic device of the wagering game machine in response to the output signal corresponding to said predetermined visual game element to cause a corresponding predetermined physical output from the haptic device, wherein the output signal to the haptic device is player-selectable from amongst said plurality of output signals.

21. A gaming machine for conducting a wagering game, comprising:

a display device;

at least one haptic device connected to a gaming machine input device configured to receive a player input; and a controller coupled to the display device and the haptic device configured, upon execution of associated instructions, to receive a wager to play a wagering game on the gaming machine;

receive a player input via a player input device, randomly determine a wagering game outcome;

display on the display device the randomly determined wagering game outcome; and synchronously output to the at least one haptic device a haptic output corresponding directly to the display of the randomly determined outcome, wherein a different haptic output is associated with each of a plurality of different randomly determined outcomes that are each associated with a winning outcome of the wagering game and result in an award as defined in a paytable for the wagering game.

* * * * *